United States Patent
Conway et al.

(10) Patent No.: US 8,280,058 B2
(45) Date of Patent: Oct. 2, 2012

(54) WIRELESS NETWORK HAVING MULTIPLE SECURITY INTERFACES

(75) Inventors: Adam Michael Conway, San Francisco, CA (US); Lee Klarich, Los Gatos, CA (US); Ning Mo, Dublin, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 154 days.

(21) Appl. No.: 12/604,837

(22) Filed: Oct. 23, 2009

(65) Prior Publication Data

US 2010/0050240 A1 Feb. 25, 2010

Related U.S. Application Data

(62) Division of application No. 11/051,486, filed on Feb. 7, 2005, now Pat. No. 7,627,123.

(51) Int. Cl.
*H04K 1/00* (2006.01)

(52) U.S. Cl. ........ 380/270; 380/247; 455/410; 455/411; 370/235; 709/227; 726/3

(58) Field of Classification Search .................. 380/270, 380/247; 455/410, 411; 370/235
See application file for complete search history.

(56) References Cited

U.S. PATENT DOCUMENTS

| | | | |
|---|---|---|---|
| 6,847,620 B1 | 1/2005 | Meier | |
| 6,938,155 B2 | 8/2005 | D'Sa et al. | |
| 6,950,628 B1 | 9/2005 | Meier et al. | |
| 7,237,125 B2 | 6/2007 | Raley et al. | |
| 7,269,735 B2 | 9/2007 | Raley et al. | |
| 7,308,703 B2 * | 12/2007 | Wright et al. | 726/1 |
| 7,339,914 B2 | 3/2008 | Bhagwat et al. | |
| 7,353,533 B2 * | 4/2008 | Wright et al. | 726/1 |
| 7,478,420 B2 * | 1/2009 | Wright et al. | 726/1 |
| 7,492,744 B2 * | 2/2009 | Dooley et al. | 370/338 |
| 7,526,800 B2 * | 4/2009 | Wright et al. | 726/11 |
| 7,546,629 B2 * | 6/2009 | Albert et al. | 726/1 |
| 7,636,936 B2 * | 12/2009 | Wright et al. | 726/1 |
| 7,904,940 B1 * | 3/2011 | Hernacki et al. | 726/1 |
| 2003/0177389 A1 * | 9/2003 | Albert et al. | 713/201 |
| 2003/0217289 A1 | 11/2003 | Ammon et al. | |

(Continued)

FOREIGN PATENT DOCUMENTS

EP 1 284 552 A2 2/2003

(Continued)

OTHER PUBLICATIONS

Co-pending U.S. Appl. No. 11/051,486, filed Feb. 7, 2005; Adam Michael Conway et al., entitled "Wireless Network Having Multiple Security Interfaces".

(Continued)

*Primary Examiner* — April Shan
(74) *Attorney, Agent, or Firm* — Harrity & Harrity, LLP

(57) ABSTRACT

A number of wireless networks are established by a network device, each wireless network having an identifier. Requests are received from client devices to establish wireless network sessions via the wireless networks using the identifiers. Network privileges of the client devices are segmented into discrete security interfaces based on the identifier used to establish each wireless network session.

20 Claims, 6 Drawing Sheets

U.S. PATENT DOCUMENTS

| | | | |
|---|---|---|---|
| 2004/0181690 A1 | 9/2004 | Rothermel et al. | |
| 2005/0055578 A1 | 3/2005 | Wright et al. | |
| 2005/0180367 A1* | 8/2005 | Dooley et al. | 370/338 |
| 2005/0260973 A1 | 11/2005 | Van De Groenendaal | |
| 2005/0260996 A1 | 11/2005 | Van De Groenendaal | |
| 2006/0002331 A1 | 1/2006 | Bhagwat et al. | |
| 2006/0068799 A1 | 3/2006 | Morton et al. | |
| 2006/0094400 A1* | 5/2006 | Beachem et al. | 455/410 |
| 2006/0120526 A1* | 6/2006 | Boucher et al. | 380/247 |
| 2006/0133338 A1* | 6/2006 | Reznik et al. | 370/338 |
| 2006/0153153 A1 | 7/2006 | Bhagwat et al. | |
| 2006/0193300 A1 | 8/2006 | Rawat et al. | |
| 2008/0109679 A1* | 5/2008 | Wright et al. | 714/37 |
| 2009/0037594 A1* | 2/2009 | Sever et al. | 709/230 |

FOREIGN PATENT DOCUMENTS

| | | |
|---|---|---|
| JP | 2004-272905 A | 9/2004 |
| WO | WO 03/055151 A1 | 7/2003 |

OTHER PUBLICATIONS

Cisco Systems, "Cisco Aironet 1100 Series Access Point Installation and Configuration Guide", Cisco IOS Release 12.2(4)JA, [Online], No. OL-2851-01, Oct. 1, 2002), XP002381713, San Jose, CA 95134-1706 USA, Installation and Configuration Guide Retrieved from the Internet: URL://http://www.cisco.com/application/pdf/en/us/guest/products/ps4612/c2001/ccmigiration_09186a0080101c2a.pdf [retrieved on May 17, 2006], pp. 8-1 to 08-5, 12-1 to 12-10, 13-1 to 13-12 and 14-1 to 14-8.

European Search Report issued May 22, 2006 in corresponding European Patent Application No. EP 06 00 0341.5.

UCDavis, "VLAN Information", Dec. 18, 1998, http://net21.ucdavis.edu/newvlan.htm.

* cited by examiner

WIRELESS NETWORK HAVING MULTIPLE SECURITY INTERFACES

RELATED APPLICATION

This application is a divisional of U.S. patent application Ser. No. 11/051,486, filed Feb. 7, 2005, which is incorporated herein by reference.

BACKGROUND OF THE INVENTION

A. Field of the Invention

The principles of the invention relate generally to wireless computer networks, and more particularly, to wireless computer networks configured to include multiple security interfaces.

B. Description of Related Art

In recent years, it has been found that Wireless Local Area Networks (WLANs) offer an inexpensive and effective extension of a wired network or standard local area network (LAN). FIG. 1 is a block diagram illustrating a conventional network 100 including both wired and wireless components. Using a wireless router or access point (AP) 102, network 100 may include wired elements, such as server 104 and local client 106 and wireless elements, such as client devices 108, 110, 112, and 114 connected to AP 102 via wireless network 116. Recently, most deployments of WLANs have conformed to the various Institute of Electrical and Electronics Engineers (IEEE) 802.11x standards (e.g., 802.11b, a, and g) that operate over the unregulated 2.4 and 5 GHz frequency spectrums. A firewall 118 may be implemented to protect network 100 and act as a security gate to fend off unauthorized traffic coming from the Internet at large 120.

In operation, client devices 108-114 may access wireless network 116 by selecting or otherwise identifying the Service Set Identifier (SSID) associated with network 116. As is known in the art, traffic across network 116 may be encrypted using several available network layer security protocols, such as the Wired Equivalent Privacy (WEP) or Wi-Fi Protected Access (WPA) protocols. Assuming that one of these protocols is employed, client devices 108-114 must enter an encryption key or password prior to being granted access to network 100.

Unfortunately, once granted, access to network 116 is granted identically to all client devices 108-114 in possession of network 116's SSID and associated password, regardless of the individual security level associated with a client device's user. Accordingly, lower level (e.g., layer 2 of the OSI Network Model) segmentation of the wireless user base is rendered impossible, thereby requiring reliance upon higher level security procedures to provide security to network 100.

SUMMARY OF THE INVENTION

One aspect consistent with principles of the invention is directed to method for providing wireless network functionality is provided. The method includes; establishing, by a network device, a number of wireless networks, each wireless network having an identifier; receiving, at the network device, requests from client devices to establish wireless network sessions via the wireless networks using the identifiers; and segmenting network privileges of the client devices into discrete security interfaces based on the identifier used to establish each wireless network session.

In a second aspect consistent with principles of the invention, a method for providing wireless network security may include mapping wireless network identifiers to predefined security policies; receiving a request from a client device to access a wireless network using one of the wireless network identifiers; establishing a wireless network session with the client device; receiving network traffic from the client device, the network traffic having a destination resource; and performing security processing on the network traffic based on the predefined security policies mapped to the wireless network identifier used to establish the wireless network session.

In a third aspect consistent with principles of the invention, an apparatus is provided. The apparatus may include a network device configured to provide discrete wireless network interfaces, each discrete wireless network interface having an identifier associated therewith, wherein the network device is configured to map the unique identifiers to security zones, wherein the network device is configured to establish wireless network sessions with client devices based on the identifiers, and wherein the network device is configured to segment security privileges of the client devices based on the security zone associated with the identifier used to establish each wireless network session.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of embodiments of the principles of the invention refers to the accompanying drawings. The same reference numbers in different drawings may identify the same or similar elements. Also, the following detailed description does not limit the invention. Instead, the scope of the invention is defined by the appended claims and equivalents.

As described herein, a network device provides access to one or more wireless networks via a number of unique identifiers. Each unique identifier is then associated with or mapped to a security zone, such that client devices access the wireless network via a unique identifier that is processed in accordance with the associated security zone.

System Overview

Figure 1:
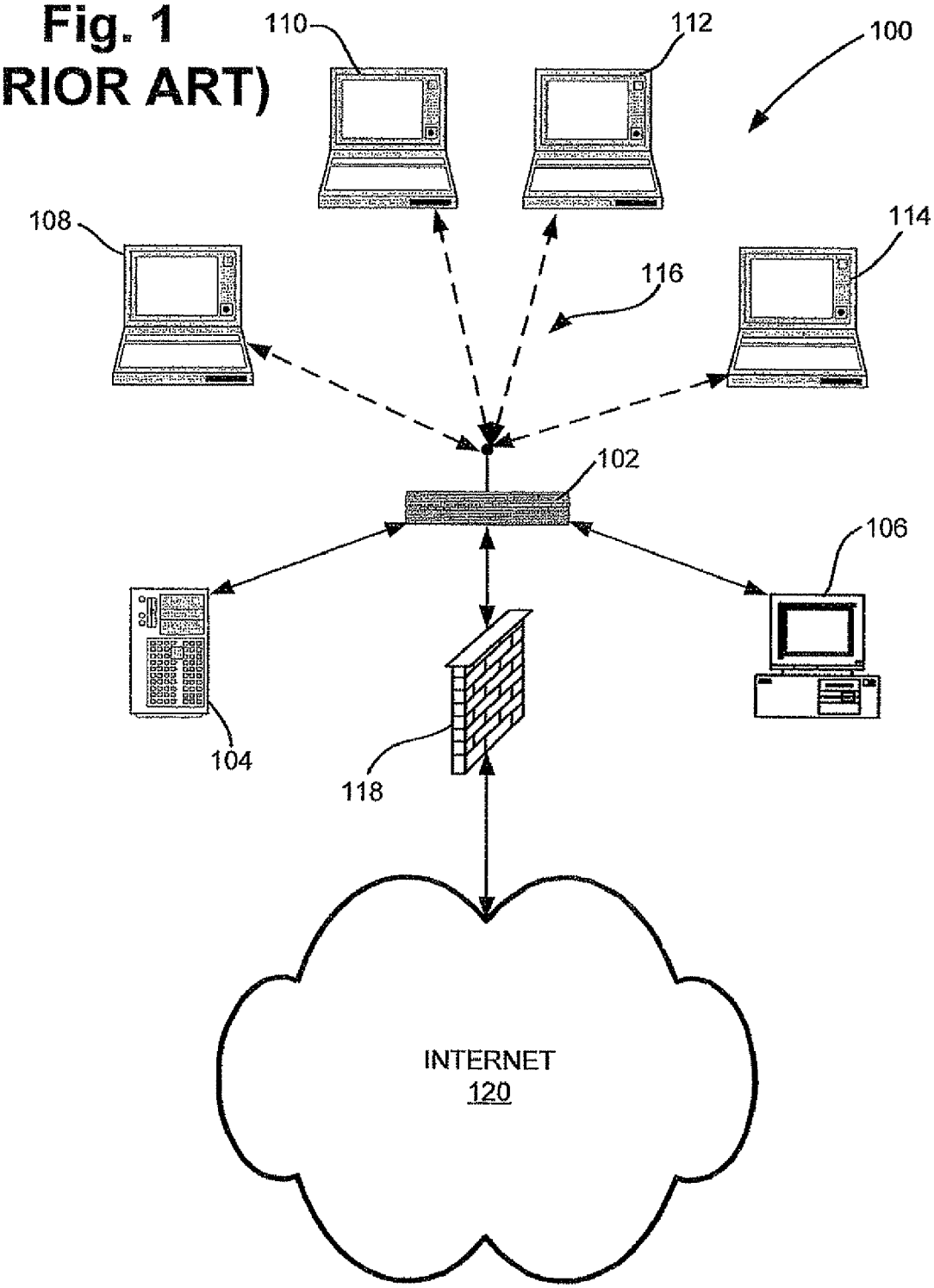
FIG. 1 is a generalized block diagram illustrating a conventional computer network.
Figure 2:
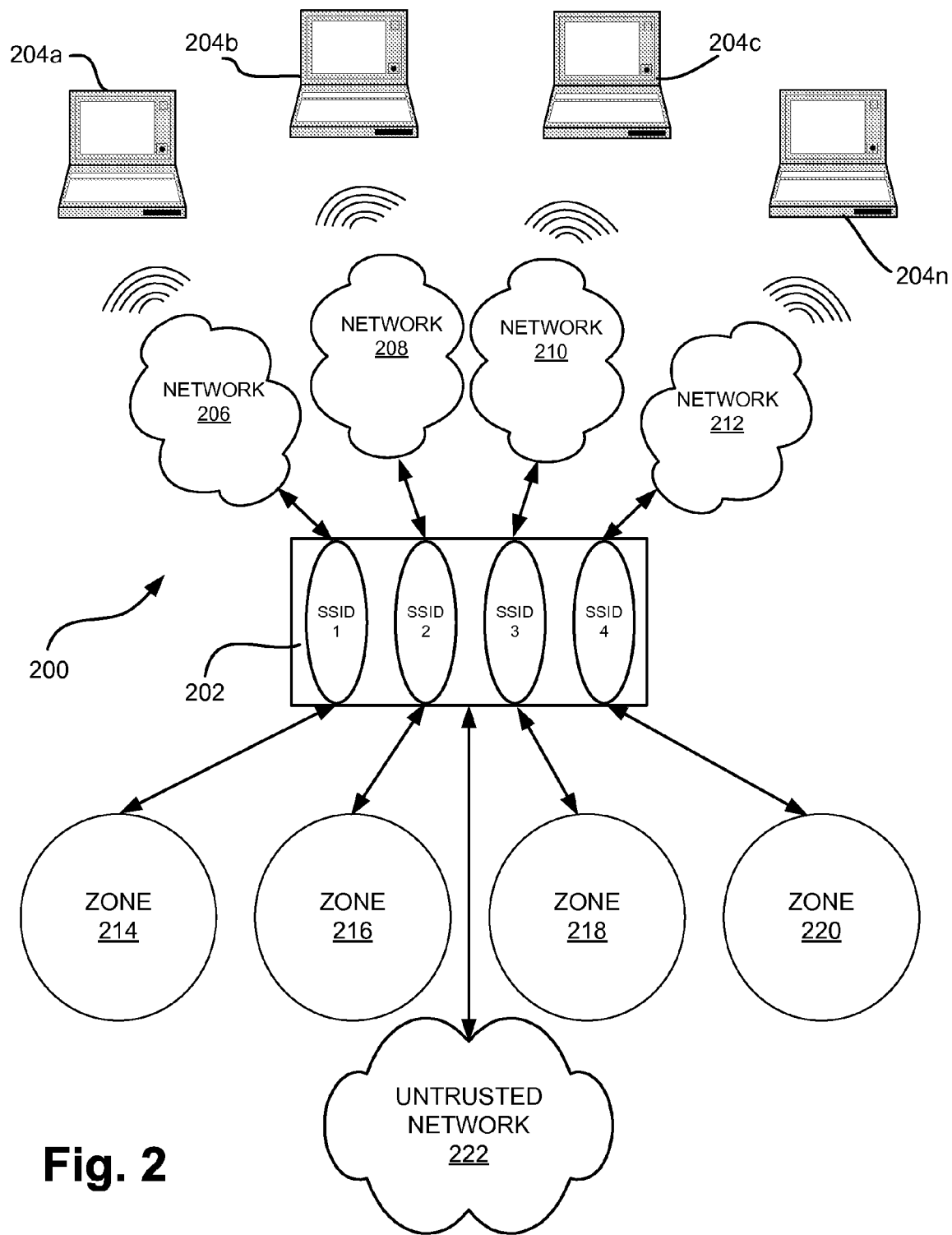
FIG. 2 illustrates an exemplary system in which systems and methods, consistent with the present invention may be implemented.

FIG. 2 illustrates an exemplary system 200 in which embodiments of systems and methods consistent with the principles of the invention may be implemented. As illustrated, system 200 may include a network device 202 and a group of client devices 204a, 204b, 204c, and 204n (collectively "client devices 204) connected to network device 202 by a number of wireless networks 206, 208, 210, and 212. Network device 202 may then map each of client devices 204 to one or more of a number of security zones 214, 216, 218, 220 based upon the network 206-212 to which they are connected. In accordance with principles of the invention, zones 214-220 may also incorporate traditional wired devices or networks, as will be described in additional detail below. Network device 202 may also be connected to an untrusted network 222, such as an external network or the Internet.

In accordance with principles of the invention, network device 202 may be configured to provide both wireless access point and network firewall functionality. More specifically, network device 202 may be configured to provide multiple discrete wireless networks and perform policy and firewall decisions between each network, thereby substantially improving the security of system 200. As illustrated in FIG. 2, in one implementation consistent with principles of the invention, network device 202 may be configured to provide four discrete wireless networks 206-212, each having a distinct SSID associated therewith. Furthermore, each wireless network 206-212 may be mapped to its own individual security zone 214, 216, 218, or 220. In this manner, each network 206-212 may be configured to provide different levels of security protection. By providing distinct networks 206-212, network device 202 provides multiple security interfaces to network 200, each of which are fully configurable from a security standpoint.

Although four distinct client devices 204 have been shown, it should be understood that the number and type of client devices 204 illustrated in FIG. 2, are provided for simplicity. In practice, a typical system may include any number and type of client devices 204. In addition, although a four zone security system has been described, the present invention may also be implemented in a system having more or fewer than four distinct security zones, including multiple zones configured either physically or logically within the system. Furthermore, although four wireless networks 206-212 are shown in the exemplary implementation, more or fewer wireless networks may be implemented in accordance with principles of the invention. Client devices 204 may include devices, such as personal computers, laptops, or other devices capable of initiating, transmitting, and receiving data and/or voice communications via networks 206-212, and 222.

In one implementation consistent with principles of the invention, network device 202 may include any combination of hardware and software capable of transmitting and receiving wireless network traffic and for applying security policies to the transmitted and received wireless network traffic. As described in additional detail below, in one implementation consistent with principles of the invention, network device 202 may be configured to transmit and receive wireless network traffic using a number of different SSIDs. In this implementation, each SSID is associated with a security zone. The network device may then apply security policies for the traffic based on the security zone associated with the SSID in use.

Untrusted network 222 may include one or more networks, such as the Internet, an intranet, a local area network (LAN), a wide area network (WAN), or another type of network that is capable of transmitting data communications from a source device to a destination device.

Figure 3:
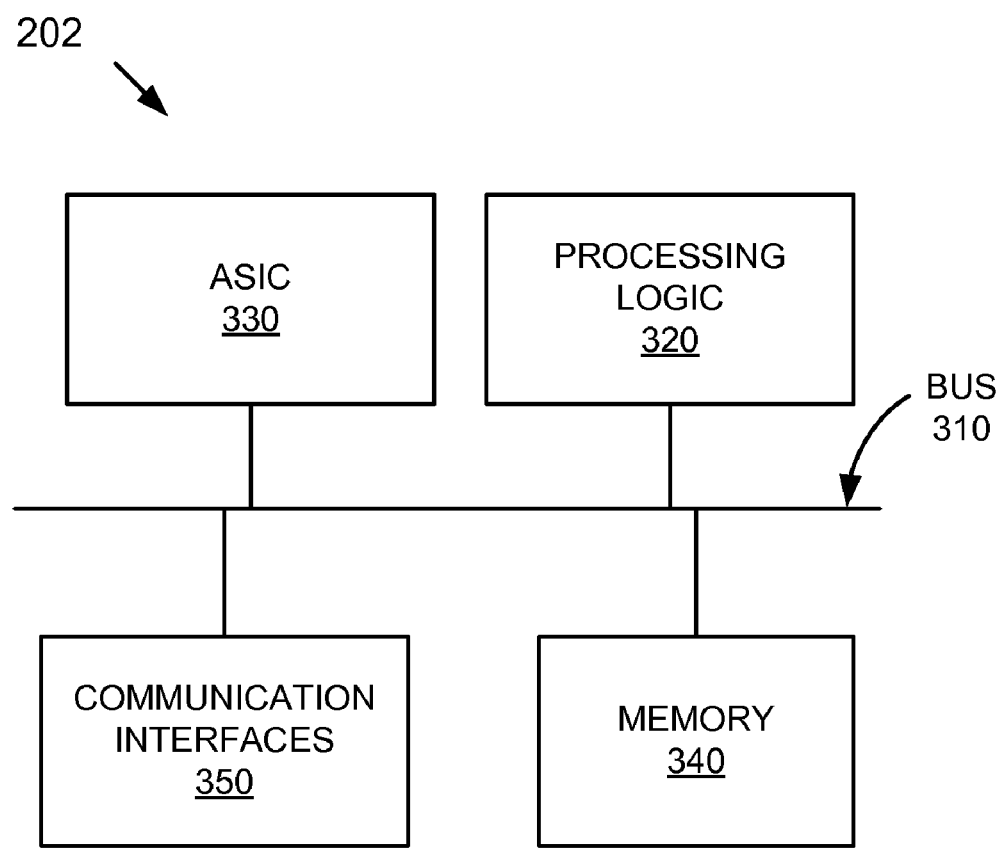
FIG. 3 illustrates an exemplary configuration of a network device in an implementation consistent with principles of the invention.

FIG. 3 is an exemplary configuration of network device 202 of FIG. 2 in an implementation consistent with the principles of the invention. It will be appreciated that client devices 204 may be similarly configured. As illustrated, network device 202 may include a bus 310, processing logic 320, an Application Specific Integrated Circuit (ASIC) 330, a memory 340, and a group of communication interfaces 350. Bus 310 permits communication among the components of network device 202.

Processing logic 320 may include any type of conventional processor or microprocessor that interprets and executes instructions. ASIC 330 may include one or more ASICs capable of performing network-related functions. More specifically, in one implementation, ASIC 330 may perform security and access point related functionality.

Memory 340 may include a random access memory (RAM) or another dynamic storage device that stores information and instructions for execution by processing logic 320; a read only memory (ROM) or another type of static storage device that stores static information and instructions for use by processing logic 320; and/or some other type of magnetic or optical recording medium and its corresponding drive. Communication interfaces 350 may include any transceiver-like mechanism that enables network device 202 to communicate with other devices and/or systems, such as client devices 204 and devices associated with networks 206-212 and 222.

As will be described in detail below, network device 202, consistent with the principles of the invention, may perform network communications-related operations. Network device 202 may perform these and other operations in response to processing logic 320 executing software instructions contained in a computer-readable medium, such as memory 340. A computer-readable medium may be defined as one or more memory devices and/or carrier waves.

The software instructions may be read into memory 340 from another computer-readable medium or from another device via a communication interface 350. The software instructions contained in memory 340 may cause processing logic 320 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Exemplary Processing

Figure 4:
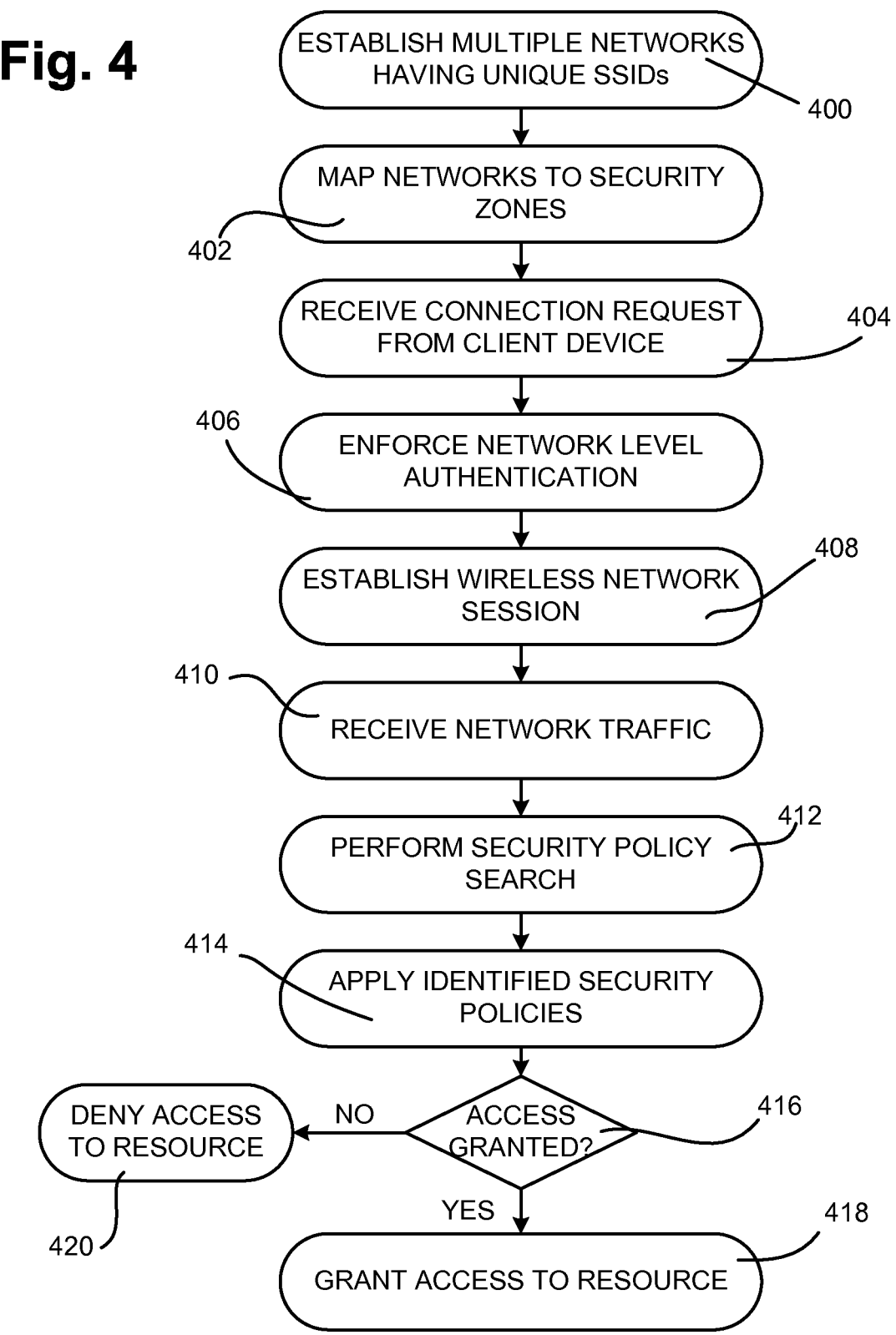
FIG. 4 is an exemplary flow diagram illustrating one implementation of processing for establishing a wireless network session and handling network traffic.

As described above, network device 202 enables the establishment of multiple wireless security zones and facilitates the exchange of network traffic between the available zones. FIG. 4 is an exemplary flow diagram illustrating one implementation of processing for establishing a wireless network session and subsequent handling of network traffic using the established session. Network device 202 is initially configured to establish a number of wireless networks 206-212, each network 206-212 having a discrete identifier associated therewith (act 400). In one exemplary implementation, the identifiers include SSIDs. As is known in the art, network device 202 may be further configured to broadcast one or more of the SSIDs, so as to announce the existence of the network(s) 206-212 to compatible client devices 204. Alternatively, network device 202 may be configured to require explicit identification of the SSIDs by the client devices 204 prior to negotiating a network session. This second method prevents identification of the network(s) 206-212 to client devices not otherwise privy to the network SSIDs.

Once the wireless networks 206-212 have been established, each network 206-212 is mapped to one of a number of security zones 214-220 through its associated SSID (act 402).

As will be described in additional detail below, each security zone may enforce differing levels of policy-based control, such that network traffic received from client devices 204 connected to network device 202 through different SSIDs are subjected to different security policies and other authentication criteria. For example, first security zone 214 may be configured to enable client devices 204 associated therewith access to trusted network resources (e.g., databases or folders within a corporate LAN) and prevent access to untrusted network resources (e.g., general web sites). Alternatively, second security zone 216 may be configured to enable client devices 204 associated therewith access only to untrusted network resources. In this manner, second zone 216 may be considered a guest zone, effectively partitioned from trusted network resources at the data link level (e.g., layer 2 of the OSI model).

Once wireless networks 206-212 have been mapped to security zones 214-220, network device 202 is ready to receive connection requests from client devices (act 404). For example, client device 204a illustrated in FIG. 2 may request access to network 206 by submitting or otherwise selecting the SSID associated with network 206 in act 400. In response to the connection request, network device 202 may enforce any wireless network level authentication or privacy considerations associated with network 206 (e.g., WEP or WPA encryption keys, etc.) (act 406). Provided that the network level (layer 3 of the OSI model) authentication or privacy information is properly provided by client device 204a, network device 202 may establish a wireless network session with client device 204a (act 408).

Once a session has been established, network device 202 may receive network traffic from client device 204a bound for a particular network resource, such as another computer or server (e.g., a web server), a networked storage device, etc. via wireless network 206 (act 410). As discussed above, the source zone for the received network traffic is determined based on the SSID used to establish the network session. In more general terms, receiving network traffic from client device 204a may involve receiving a packet or other unit of data designating source and destination addresses and ports as well as an indication regarding the type of service or protocol requested (e.g., a packet's five-tuple). By examining information included within the packet (e.g., the destination IP address and/or port), network device 202 may identify the destination zone associated with the packet. The destination zone, in combination with the source zone of the traffic, is then used to identify the security policies to be applied. For example, client device 204a may request access to a database connected to network device 202 by a wired network connection (e.g., an Ethernet connection) in security zone 216. It should be understood that each network resource available to client device 204a is also associated with one of security zones 214-220 or untrusted network 222. Additionally, it should be understood that, in addition to a packet's five-tuple, any suitable packet information may be utilized to identify a destination zone and/or processing to be applied to the traffic.

Upon receipt of the network traffic, network device 202 may perform a security policy search (act 412) and may apply any identified network security policies or other network processing based on the security zone associated with the client device 204 making the request and the relevant security zone of the requested network resource (act 414). In the present example, security policies based on requests from first security zone 214 for resources in second security zone 216 are applied, since client device 204a has established a wireless network session with network device 202 via network 206 and the desired database resides in zone 216.

Additional examples of security policies may include additional levels of encryption or authentication, such as establishment of a virtual private network (VPN) connection, an IPSec tunnel, or a similar encryption/authentication procedure. Furthermore, the policy processing may also perform additional functions, such as URL filtering or other content-based restrictions on network access. In addition to security-based processing, additional information processing, such as information translations may also be performed by network device 202. For example, incoming packets may be network address translated or port translated so as to modify various pieces of information in outgoing or transmitted data packets.

At this point, it is determined whether the applied security policies permit the access to the requested resource (act 416). If so, the access is permitted (act 418). However, if the applied security policies do not permit access to the requested resource, access is denied (act 420).

As is understood in the art, upon establishing a wireless session between a client device 204 and network device 202, client device 204 is typically assigned an IP address associated with the network. In many implementations, this assignment is performed by a DHCP server (not shown) associated with network device 202. In an implementation consistent with principles of the invention, the DHCP server may be configured to apply different ranges of IP addresses to client devices based on various criteria (e.g., media access control (MAC) addresses, physical location, type of device, etc.). For example, client device 204a establishing a network session may be assigned IP addresses in the 10.12.2.10-40 range, while client device 204b may be assigned IP address in the 10.12.2.41-100 range. In this manner, assigned IP addresses may be used to map devices into several security zones.

Figure 5:
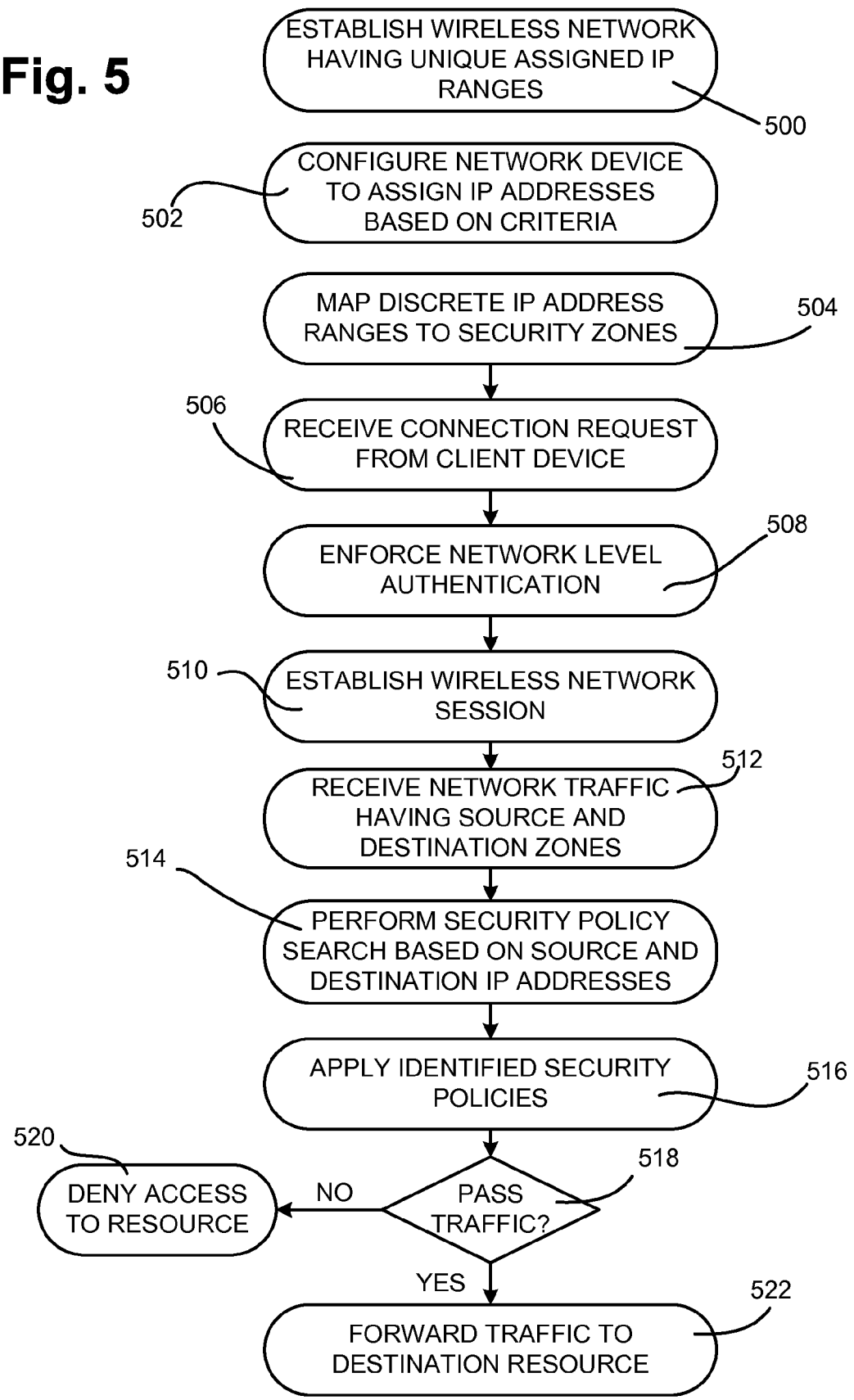
FIG. 5 is exemplary flow diagrams illustrating another implementation of processing for establishing a wireless network session and handling network traffic.

FIG. 5 is another exemplary flow diagram illustrating one implementation of processing for establishing a wireless network session and subsequent handling of network traffic using the established session. In FIG. 5, the network device may be initially configured to establish a wireless network having a single SSID (act 500).

Once the wireless network has been established, a DHCP server associated with the network device may be configured to assign unique IP address ranges based on various criteria associated with the respective client devices (act 502). In one implementation consistent with principles of the invention, each IP address range may be mapped to one of a number of security zones (act 504). As will be described in additional detail below, each security zone may enforce differing levels of policy-based control, such that network traffic received from client devices connected to network device through different IP address ranges are subjected to different security policies and other authentication criteria. For example, a first IP address range may be configured to enable client devices associated therewith access to trusted network resources (e.g., databases or folders within a corporate LAN) and prevent access to untrusted network resources (e.g., general web sites). Alternatively, a second IP address range may be configured to enable client devices associated therewith access only to untrusted network resources. In this manner, the second IP address range may be assigned to client devices having a "guest" status, effectively partitioning those client devices from trusted network resources at the data link level (e.g., layer 2 of the OSI model).

Once the various IP address ranges have been associated with the security zones, the network device is ready to receive a connection request from a client device (act 506). For example, a client device may request access to the network by submitting or otherwise selecting the SSID associated with the network in act 500. In response to the connection request, the network device may enforce any wireless network security associated with the network (e.g., WEP or WPA encryption keys, etc.) (act 508). Provided that the network layer (layer 3 of the OSI model) security information is properly provided by client device, the network device may establish a wireless network session with client device (act 510).

Once a session has been established, the network device may receive network traffic from the client device bound for a particular network resource, such as another computer or server (e.g., a web server), a networked storage device, etc. via the wireless network (act 512). As described above, a source zone is assigned to the traffic based upon the IP address assigned to the client device. By examining the information in the packet, the network device may identify the destination zone associated with the traffic. For example, the client device having a first IP address within the first range of assigned IP addresses (mapped to a first zone) may request access to a database having an IP address within a second range of assigned IP addresses (mapped to a second zone) and connected to the network device by a wired network connection (e.g., an Ethernet connection). It should be understood that each network resource available to the client device is assigned a unique IP address within the various predetermined ranges of IP addresses, thereby designating the security zone associated with the network resource.

Upon receipt of the network traffic, the network device may perform a security policy search based on the identified source and destination security zones (act 514) and may apply any identified network security policies (act 516). In the present example, security policies based on requests from a client device assigned an IP address within a first range of IP addresses for access to a resource having an IP address in a second range of IP addresses are applied.

At this point, it is determined whether the applied security policies permit the network traffic to pass through to the requested resource (act 518). If so, the traffic is passed through (act 520). However, if the applied security policies do not permit the traffic to pass, access is denied (act 522). By mapping discrete IP address ranges to individual security zones, information regarding a client device's security level may be associated with a packet throughout its passage through the network.

EXAMPLE

Figure 6:
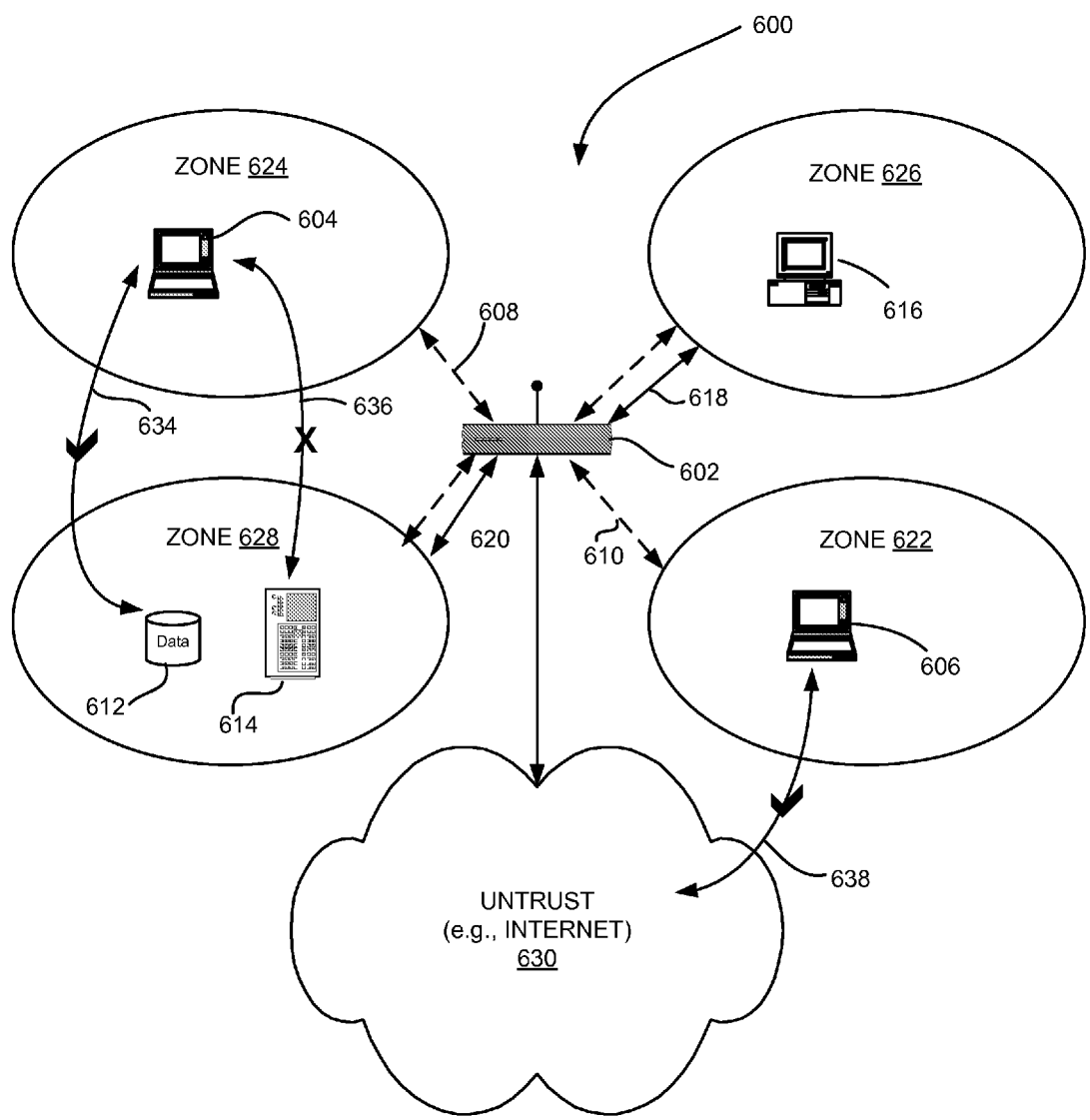
FIG. 6 illustrates another exemplary system in which systems and methods consistent with the present invention may be implemented.

FIG. 6 illustrates an exemplary system 600 in which embodiments of systems and methods consistent with the principles of the invention may be implemented. As illustrated, system 600 may include a network device 602 and client devices 604 and 606 connected to network device 602 by wireless connections 608 and 610. Additionally, wired network resources 612, 614, and 616 are also connected to network device 602 by wired connections 618 and 620. Each of client devices 604 and 606 and network resources 612-616 are associated with one of four security zones 622, 624, 626, and 628. In a manner consistent with principles of the invention, the security zone association of client devices 604 and 606 may be based on the wireless connection 608 or 610 to which the client devices are connected. Security zone associations for wired network resources 612-616 may be based on traditional security processing. Network device 602 may also be connected to an untrusted network 630, such as an external network or the Internet.

In the present implementation, network device 602 receives two packets from client device 604, a first packet bound for a database server 612 (represented by arrow 632) and a second packet bound for a web server 614 (represented by arrow 634). In accordance with principles of the invention, network device 602, in response to the received packets, may perform a policy search relating to packets having a second zone 624 source and a fourth zone 628 destination. The policy search may reveal that client device 604 in second zone 624 may connect to database server 612, and may not connect to web server 614. Similarly, in response to a packet received from client device 606 in first zone 622 requesting an internet resource (represented by arrow 636) in untrusted zone 630, network device 602 may determine that such packets are permitted based on the source security zone associated with client device 606 to connect to network device 602.

CONCLUSION

Implementations consistent with principles of the invention provide for enhanced wireless network security by segmenting client devices accessing a wireless network based on a number of discrete SSIDs. In this manner, systems consistent with principles of the invention provide substantially improved security at the lower and more secure levels, rather than relying solely upon higher level security for networked client devices.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

Moreover, while a series of acts has been disclosed with regard to FIGS. 4 and 5 the order of the acts may be varied in other implementations consist with the present invention. Furthermore, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit (ASIC) or a field programmable gate array, software, or a combination of hardware and software. While aspects have been described in terms of processing messages or packets, these aspects may operate upon any type or form of data, including packet data and non-packet data. The term "data unit" may refer to packet or non-packet data.

No element, act, or instruction used in description of the present invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method comprising:

establishing, by a network device, a plurality of wireless network sessions between the network device and a plurality of client devices, each of the plurality of client devices transmitting data from one of a plurality of wireless networks, each one of the plurality of wireless networks being associated with one of a plurality of security zones, each of the plurality of security zones being associated with a different one of a plurality of security policies;

receiving, at the network device and from a client device of the plurality of client devices, network traffic destined for a network resource, the network traffic including a source address and a destination address, the source address being associated with a first one of the plurality of wireless networks, the destination address being associated with the network resource;

identifying, at the network device and using the source address and the destination address of the network traffic, a first security zone and a second security zone of the plurality of security zones, the first security zone being associated with the first one of the plurality of wireless networks and the second security zone being associated with a second one of the plurality of wireless networks that is associated with the destination address; and performing, at the network device, security processing on the network traffic based on security policies, of the plurality of security policies, associated with the identified first security zone and the identified second security zone.

2. The method of claim 1, where each of the plurality of wireless networks is associated with a different one of a plurality of identifiers, each of the plurality of identifiers being associated with a different one of the plurality of security zones, and where performing security processing on the network traffic comprises:
identifying, by the network device, the security policies based on identifiers, of the plurality of identifiers, associated with the identified first security zone and the identified second security zone.

3. The method of claim 1, further comprising:

receiving, at the network device and from another client device of the plurality of client devices, other network traffic destined for the network resource, the other network traffic including another source address and the destination address, the other source address being associated with another one of the plurality of wireless networks;

identifying, at the network device and using the other source address and the destination address of the other network traffic, a third security zone of the plurality of security zones, the third security zone being associated with the other one of the plurality of wireless networks associated with the other source address; and performing, at the network device, security processing on the other network traffic based on the identified third security zone and the identified second security zone being associated with the other network traffic.

4. The method of claim 3, where performing security processing comprises:

identifying, by the network device, the security policies based on the first security zone and the second security zone;

identifying, by the network device, different security policies based on the third security zone and the second security zone;

applying, by the network device, the security policies to the network traffic to determine whether to forward the network traffic to the network resource; and applying, by the network device, the different security policies to the other network traffic to determine whether to forward the other network traffic to the network resource.

5. The method of claim 1, where performing security processing on the network traffic comprises:

selectively transmitting, by the network device, the network traffic to the network resource based on the security policies.

6. The method of claim 1, further comprising:

establishing, by the network device and prior to establishing the plurality of network sessions, the plurality of wireless networks.

7. The method of claim 1, further comprising:

receiving, at the network device, from each of the plurality of client devices, and prior to establishing the plurality of wireless network sessions, a request to establish a respective one of the plurality of wireless network sessions; and authenticating, by the network device, each of the plurality of client devices based on a respective one of the requests received from the plurality of client devices.

8. The method of claim 1, further comprising:

performing, by the network device and prior to establishing each of the plurality of wireless network sessions, network level authentication on each of the plurality of client devices.

9. A device comprising:

a memory to store instructions; and logic, implemented at least partially in hardware, to execute the instructions to:
identify a plurality of identifiers, each of the plurality of identifiers being associated with a different wireless network of a plurality of wireless networks,
map each of the plurality of identifiers to one of a plurality of security zones, each of the plurality of security zones being associated with a different one of a plurality of security policies,
receive, during a wireless network session, network traffic from a client device, the network traffic including one of the plurality of identifiers and a destination address associated with a network resource,
identify a destination security zone based on the destination address,
identify a source security zone of the plurality of security zones based on the one of the plurality of identifiers included in the network traffic, and
perform security processing on the network traffic based on one or more security policies, of the plurality of security policies, associated with the identified source security zone and the identified destination security zone.

10. The device of claim 9, where the logic is further to execute the instructions to one of:

determine that the performed security processing permits the client device to access the network resource, or determine that the performed security processing does not permit the client device to access the network resource.

11. The device of claim 9, where, prior to performing security processing on the network traffic, the logic is to execute the instructions to:
identify the one or more security policies using the identified source security zone in combination with the identified destination security zone.

12. The device of claim 9, where the logic is further to execute the instructions to:
receive, during another wireless network session, additional network traffic from another client device, the additional network traffic including another one of the plurality of identifiers and another destination address, the other wireless network session occurring concurrently with the wireless network session,
identify another destination security zone based on the other destination address associated with another network resource,
identify another source security zone of the plurality of security zones based on the other one of the plurality of identifiers included in the additional network traffic, and
perform security processing on the additional network traffic based on the identified other source security zone and the identified other destination security zone.

13. The device of claim 12, where the logic is further to execute the instructions to:
determine whether the security processing performed on the additional network traffic permits the other client device to access the other network resource.

14. A non-transitory computer-readable medium comprising:
one or more instructions which, when executed by a processor of a network device, cause the processor to establish a plurality of wireless network sessions between the network device and a plurality of client devices, each of the plurality of client devices transmitting data from one of a plurality of wireless networks, each one of the plurality of wireless networks being associated with one of a plurality of security zones, each of the plurality of security zones being associated with a different one of a plurality of security policies;
one or more instructions which, when executed by the processor, cause the processor to receive, from a client device of the plurality of client devices, network traffic destined for a network resource, the network traffic including a source address and a destination address, the source address being associated with a first one of the plurality of wireless networks, the destination address being associated with the network resource;
one or more instructions which, when executed by the processor, cause the processor to identify, using the source address and the destination address of the network traffic, a first security zone and a second security zone of the plurality of security zones, the first security zone being associated with the first one of the plurality of wireless networks and the second security zone being associated with a second one of the plurality of wireless networks that is associated with the destination address; and
one or more instructions which, when executed by the processor, cause the processor to perform security processing on the network traffic based on security policies, of the plurality of security policies, associated with the identified first security zone and the identified second security zone.

15. The non-transitory computer-readable medium of claim 14, where each of the plurality of wireless networks is associated with a different one of a plurality of identifiers, each of the plurality of identifiers being associated with a different one of the plurality of security zones, and
where the one or more instructions to perform security processing on the network traffic comprise:
one or more instructions to identify the security policies based on identifiers, of the plurality of identifiers, associated with the identified first security zone and the identified second security zone.

16. The non-transitory computer-readable medium of claim 14, further comprising one or more instructions which, when executed by the processor, cause the processor to:
receive, from another client device of the plurality of client devices, other network traffic destined for the network resource, the other network traffic including another source address and the destination address, the other source address being associated with another one of the plurality of wireless networks;
identify, using the other source address and the destination address of the other network traffic, a third security zone of the plurality of security zones, the third security zone being associated with the other one of the plurality of wireless networks associated with the other source address; and
perform security processing on the other network traffic based on the identified third security zone and the identified second security zone being associated with the other network traffic.

17. The non-transitory computer-readable medium of claim 16, where the one or more instructions to perform security processing comprise:
identify the security policies based on the first security zone and the second security zone;
identify different security policies based on the third security zone and the second security zone;
apply the security policies to the network traffic to determine whether to forward the network traffic to the network resource; and
apply the different security policies to the other network traffic to determine whether to forward the other network traffic to the network resource.

18. The non-transitory computer-readable medium of claim 14, where the one or more instructions to perform security processing on the network traffic comprise:
one or more instructions to selectively transmit the network traffic to the network resource based on the security policies.

19. The non-transitory computer-readable medium of claim 14, further comprising:
one or more instructions which, when executed by the processor, cause the processor to establish, prior to establishing the plurality of network sessions, the plurality of wireless networks.

20. The non-transitory computer-readable medium of claim 14, further comprising one or more instructions which, when executed by the processor, cause the processor to:
receive, from each of the plurality of client devices, and prior to establishing the plurality of wireless network sessions, a request to establish a respective one of the plurality of wireless network sessions; and
authenticate each of the plurality of client devices based on a respective one of the requests received from the plurality of client devices.

* * * * *